US000001849H

United States Statutory Invention Registration [19]

[11] Reg. Number: H1,849

Fourie et al.

[45] Published: May 2, 2000

[54] FISCHER-TROPSCH PRODUCTS AS FUEL FOR FUEL CELLS

[75] Inventors: Jan Hendrik Fourie, Randburg; Jacob Willem De Boer, Centurion, both of South Africa

[73] Assignee: Sasol Technology (Proprietary) Limited, Johannesburg, South Africa

[21] Appl. No.: 09/197,733

[22] Filed: Nov. 20, 1998

[51] Int. Cl.[7] ..... H01M 8/06

[52] U.S. Cl. ..... 429/17; 429/20

*Primary Examiner*—Harold J. Tudor
*Attorney, Agent, or Firm*—Brinks Hofer Gilson & Lione

[57] ABSTRACT

Fischer-Tropsch fuels having low levels of sulphur and other impurities are applied as fuels for use in fuel cell systems.

20 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Schematic diagram of LTFT process

A typical hydrocarbon fueled fuel cell/reformer system

Schematic diagram of LTFT process

FISCHER-TROPSCH PRODUCTS AS FUEL FOR FUEL CELLS

BACKGROUND OF THE INVENTION

A fuel cell is an electrochemical cell that can continuously convert the chemical energy formed as a result of a reaction between a fuel and an oxidant to electrical energy. Fuel cells are highly efficient, and the emission levels of these cells are considerably below existing standards.

In a fuel cell, a fuel and an oxidant combine electrochemically without combustion to produce the electrical energy. As long as the cell is continuously supplied with fuel and oxidant, electrical power can be obtained. The fuel of choice in a fuel cell is hydrogen. When hydrogen is used as the fuel, air (oxygen) is normally used as the oxidant. There are, however, a number of disadvantages associated with the use of hydrogen as a fuel. Among these disadvantages are the large weight and volume of gas required in fuel storage systems, the loss of a large percentage of stored energy when the hydrogen is liquefacted, and the present high price of clean hydrogen gas. In addition, the existing infrastructure for distribution of hydrogen is inadequate.

Hydrogen for use as fuel in a fuel cell can be produced internally from hydrocarbons such as natural gas, methanol, diesel, gasoline and other fuels. This is typically achieved in a fuel cell system through the use of a reformer, which reforms hydrocarbon feedstocks to produce hydrogen and carbon monoxide. Some fuel cell systems require an additional shift reaction to convert the carbon monoxide, which can be detrimental to the functioning of the fuel cell, to carbon dioxide.

A typical schematic example of a fuel cell/reformer system is shown in FIG. 1.

The advantage of using hydrocarbons as a fuel for fuel cell systems is that no requirement for hydrogen per se to be transported or stored exists, as hydrogen is internally produced. Most hydrocarbon distribution networks are already in place and consumers are familiar with the handling of hydrocarbons such as natural gas, town gas, diesel and gasoline. Natural gas can, for instance, be supplied directly to the reformer of a stationary fuel cell system and used to generate on-site electricity. Liquid hydrocarbon fuels such as diesel and gasoline would be even more advantageous, as their transporting, storage, and handling characteristics are the same as for conventional diesel or gasoline fueled vehicles.

However, there is a disadvantage when using hydrocarbon sources such as natural gas, gas derived from coal sources (e.g. synthesis gas) and petroleum liquid fuels (e.g. diesel). This disadvantage is that these hydrocarbon sources often contain high levels of sulphur . Sulphur is known to poison both the reforming catalyst and the fuel cell itself.

Typical values of sulphur levels in more environmentally friendly liquid hydrocarbons are shown in Table 1.

TABLE 1

Sulphur levels occurring in liquid hydrocarbon fuels

| Fuel | Sulphur level (ppm) |
|---|---|
| Unleaded reference | 100 |
| California reformulated gasoline | 33 |
| 85% ethanol 15% gasoline | 8 |

According to U.S. Pat. No. 5,589,285, the performance of the co-fired or solid oxide, electrolyte fuel cells degrade considerably when used in a process with sulphur bearing fuels, even at concentrations as low as 1 part per million (ppm). According to a technical report from Westinghouse Electric Company to the Department of Energy, Report No. DOE/MC/22046-2371, sulphur-bearing fuels in solid oxide fuel cells were tested at levels of 2, 10, 25 and 50 ppm. The tests showed that the presence of these levels of sulphur resulted in the degradation of the fuel cell. In an attempt to prevent or lessen the sulphur poisoning of fuel cells, U.S. Pat. No. 5,686,196 teaches a process for the desulphurization of diesel fuels to values less than 1 ppm, prior to the reforming stage to prevent poisoning of the reforming catalyst.

Federal Specification VV-F-800D limits the sulphur content of diesel fuel to between 0.25 and 0.5 weight percent. Some of the more stringent requirements, like those imposed by the Southern California Air Quality Management District and Air Resource Board, currently limit the amount of sulphur in diesel to 0.05 weight percent.

These prior art examples demonstrate that if commercially available hydrocarbons such as natural gas and petroleum-derived liquids fuels, e.g. diesel, were to be used in a fuel cell system, a hydrodesulphurizing step would be required to remove the sulphur. Alternatively, a reforming system and fuel cell would have to be developed that would be tolerant to sulphur in the fuel.

SUMMARY OF THE INVENTION

The present inventors have now found that Fischer-Tropsch fuels, due to their quality of having very low levels of sulphur and other impurities such as aromatics and nitrogen compounds, can be successfully applied as fuels for fuel cell systems. The use of the Fischer-Tropsch fuels eliminates the necessity of including a hydrodesuphurizing step in the fuel cell system. Furthermore, the use of such fuels does not necessitate the use of sulphur tolerant materials in the fuel cell.

DETAILED DESCRIPTION OF THE INVENTION

Typically, hydrocarbons are obtained from naturally occurring sources such as crude oil. However, hydrocarbon fuels can also be synthesized from synthesis gas (a mixture of hydrogen and carbon monoxide) derived from coal or the reforming of natural gas making use of the Fischer-Tropsch process. The Fischer-Tropsch reaction catalytically converts synthesis gas into hydrocarbons in the typical reaction as follows:

(1) $2nH_2+nCO \rightarrow C_nH_{2n}+nH_2O$ (2) $(2n+1)H_2+nCO \rightarrow C_nH_{2n+2}+nH_2O$ (3) $2nH_2+nCO \rightarrow C_nH_{2n+1}OH+(n-1)H_2O$ Examples of active catalysts used in the Fischer-Tropsch reaction include Fe, Co, Ni and Ru, either with a support or without a support. If supported, the supports can include inorganic oxides. The products from a commercial Fischer-Tropsch process include, among others, tail gas (which can be utilized as town gas), gasoline, diesel oil, wax and alcohols.

Fischer-Tropsch reaction products generally have low levels of sulphur. Typically, these levels are less than 1 ppm.

In addition, if the downstream work-up products of the Fischer-Tropsch reaction do not include sulphur-containing reactants or catalysts, then these products too, are low in sulphur.

Fischer-Tropsch reactions typically occur in the range between 210 and 350° C.

The present inventors have determined that Fischer-Tropsch fuels, due to their quality of having very low levels of sulphur and also having low levels of other impurities such as aromatics and nitrogen compounds, can be successfully applied as fuels for fuel cell systems. The application of Fischer-Tropsch products as fuels has the advantage of providing a unique fuel cell system that neither requires a sulphur removal step nor the use of sulphur tolerant materials.

The invention is now further illustrated by the following non-limiting examples.

EXAMPLE 1

This example describes a synthesis of certain low-sulphur diesel products utilizing a Low Temperature Fischer-Tropsch (LTFT) process. The low-sulphur diesel products are suitable for use as a fuel in a fuel cell. The synthesis gas ($H_2$+CO) used in the LTFT process is obtained by conventional processes such as coal gasification or reforming of natural gas. The synthesis gas is converted via the LTFT synthesis process (i.e. within the range of 210° to 275° C.) to produce hydrocarbon products having carbon numbers in the range of $C_1$ to $C_{100}$+. The Low Temperature Fischer-Tropsch synthesis process is well-known, and is described, for example, in an article by B. Jager and R. Espinoza, Advances in Low Temperature Fischer-Tropsch Synthesis, Catalysis Today, 23, pp. 17–28 (1995).

The operating conditions for this specific example were as follows:

Temperature: 230° C.

Pressure: 20 bar.

The synthesis gas used in this example was derived from coal. A supported cobalt catalyst was used in the Fischer-Tropsch reaction.

Figure 1:
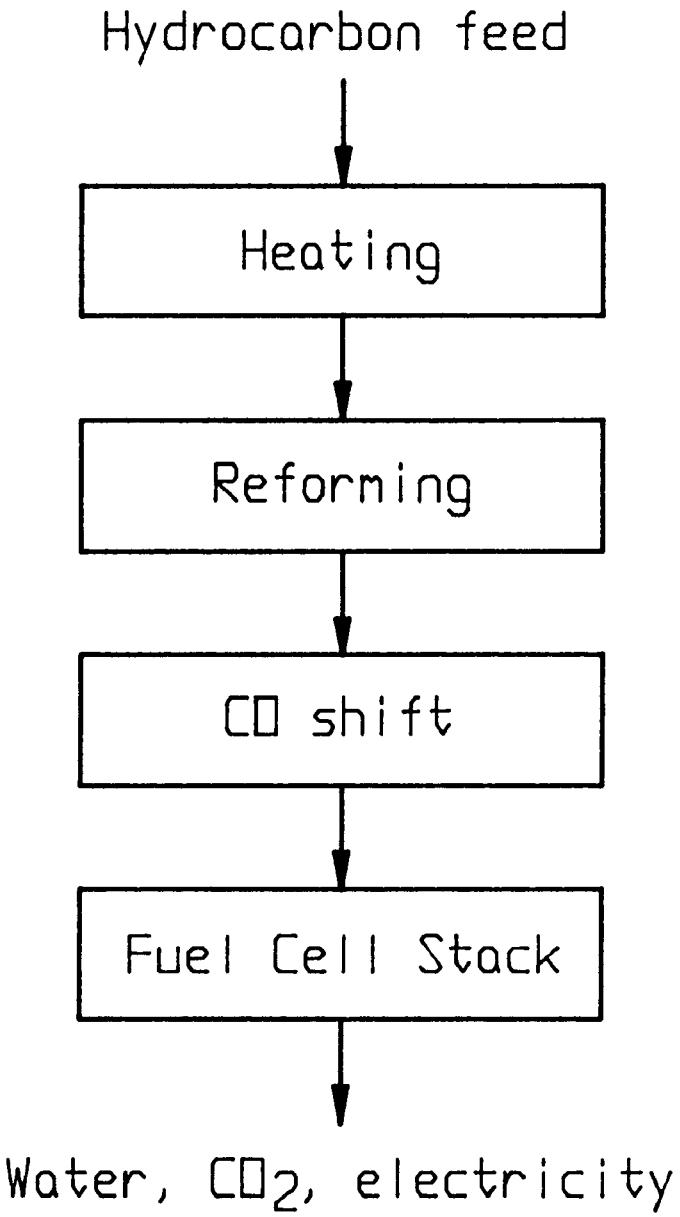
FIG. 1 illustrates a typical hydrocarbon fueled fuel cell/reformer system.
Figure 2:
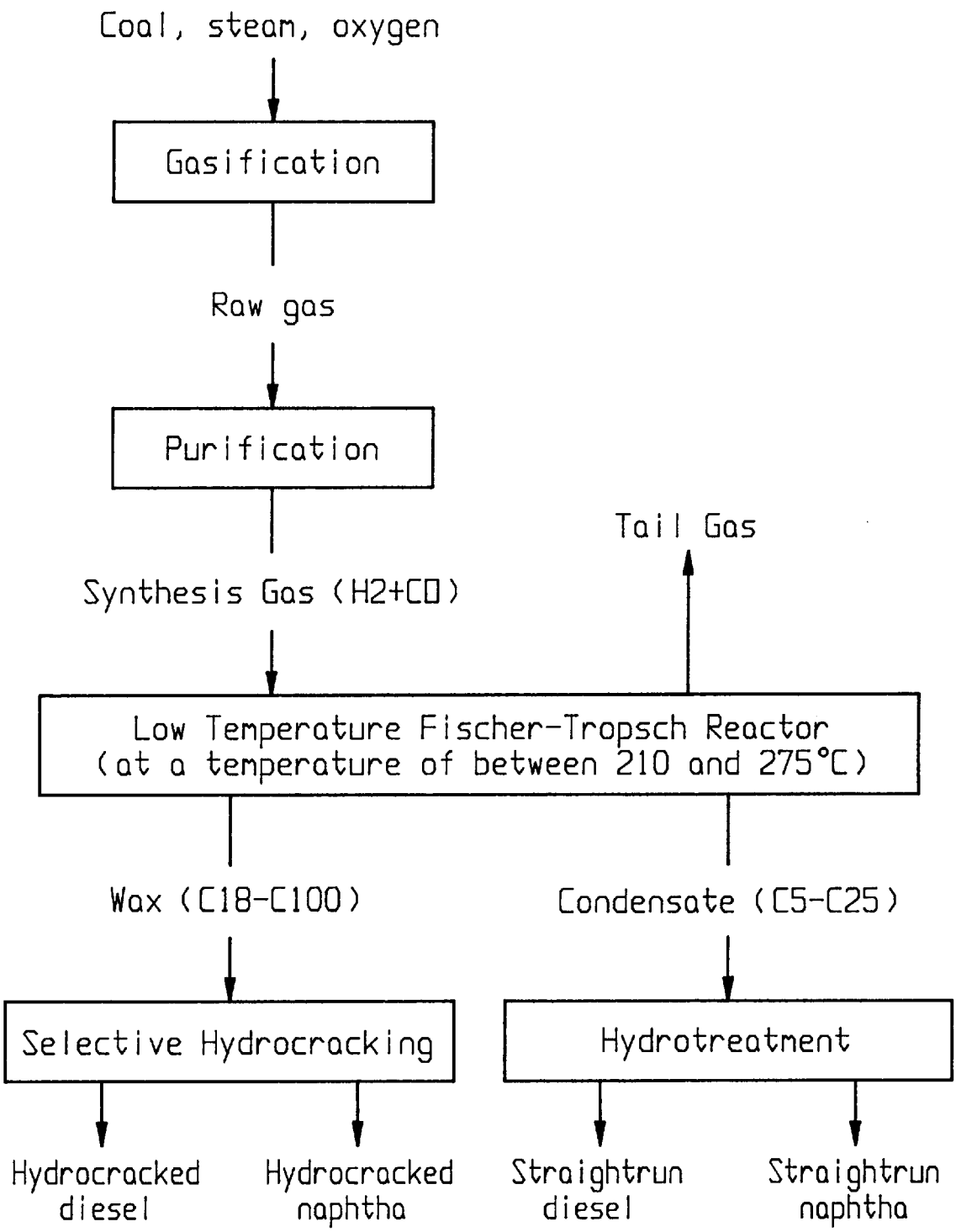
FIG. 2 illustrates a schematic diagram of a Low Temperature Fischer-Tropsch (LTFT) process.

A schematic diagram of the process is shown in FIG. 2.

The Fischer-Tropsch products include tail gas ($C_1$), condensate ($C_2$–$C_{25}$) and wax ($C_{18}$–$C_{100}$+). The wax can be further treated by means of a selective hydrocracking step to produce hydrocracked diesel ($C_9$–$C_{23}$) and naphtha products. The condensate ($C_5$–$C_{25}$) can be hydrotreated to produce straight-run diesel ($C_9$–$C_{17}$) and naphtha ($C_5$–$C_9$) products. Selective hydrocracking procedures and hydrotreatment procedures are well-known to those of ordinary skill in the art. Any of these Fischer-Tropsch products, i.e, tail gas, condensate, wax, hydrocracked diesel and naphtha, and straight run diesel and naphtha products are suitable for use as fuels in the fuel cells.

The condensates will include oxygenates such as alcohols and acids. Alcohols, in particular, are an option for use as a fuel in a fuel cell. When alcohols are used, it may be necessary to recover the alcohol from the reaction water. Although alcohols are not presently recovered from LTFT reactions due to economic considerations, they may be recovered from the water of the higher temperature Fischer-Tropsch operation. These alcohols also have a sulphur content of less than 1 ppm.

The level of sulphur in the products from the above LTFT process was measured. The sulphur levels are provided Table 2.

TABLE 2

Sulphur levels in the Fischer-Tropsch products

| Fischer-Tropsch Product | Carbon Range | Sulphur levels |
|---|---|---|
| Substitute natural gas (tail gas) | C1 | 20–30 ppb |
| Diesel from hydrocracked Low Temperature Fischer-Tropsch (LTFT) product | C9–C23 | <1 ppm |
| Straight Run Diesel from LTFT process | C9–C17 | <1 ppm |
| Naphtha from hydrocracked LTFT product | — | <1 ppm |
| Straight Run Naphtha from LTFT process | C5–C9 | <1 ppm |

EXAMPLE 2

Example 2 describes a synthesis process similar to that of Example 1, except that the operating conditions have been varied as follows:

Temperature: 240° C.

Pressure: 20 bar.

The synthesis gas used in this example was also derived from coal. A precipitated iron catalyst was used in the Fischer-Tropsch reaction. The level of sulphur in the products derived from this synthesis was measured, and is provided in Table 3.

TABLE 3

Sulphur levels in the Fischer-Tropsch products

| Fischer-Tropsch Product | Carbon Range | Sulpur levels |
|---|---|---|
| Tail gas | C1 | 20–30 ppb |
| Diesel from hydrocracked Low Temperature Fischer-Tropsch (LTFT) product | C9–C23 | <1 ppm |
| Straight Run Diesel from LTFT process | C9–C17 | <1 ppm |
| Naphtha from hydrocracked LTFT product | — | <1 ppm |
| Straight Run Naphtha from LTFT process | C5–C9 | <1 ppm |

Due to the very low levels of sulphur in these products, they may be used as fuels in fuel cells without the necessity of a hydrodesulphurizing step, or without the necessity of modifying the fuel cell system to make it tolerant to sulphur.

Although the examples provided above utilize LTFT synthesis, the invention is not so limited. It is believed that the sulphur levels in products obtained from a higher temperature FT synthesis should likewise have low levels of sulphur, provided that there is no sulphur contamination downstream. Thus, High Temperature Fischer-Tropsch synthesis may also be utilized to produce the low-sulphur hydrocarbon feedstock products.

What is claimed is:

1. A process for preparing low-sulphur hydrocarbon feedstock products for use as fuel in a fuel cell, the process comprising:

providing a synthesis gas comprising hydrogen and carbon monoxide; and converting said synthesis gas via Fischer-Tropsch synthesis to hydrocarbon feedstock products, said hydrocarbon products selected from the group consisting of tail gas, condensate, wax, straight-run diesel and naphtha products, hydrocracked diesel and naphtha products, and mixtures of the foregoing.

2. The process of claim 1, wherein said Fischer-Tropsch synthesis is a Low Temperature Fischer-Tropsch synthesis.

3. The process of claim 2, wherein the Low Temperature Fischer-Tropsch synthesis is carried out at a temperature between about 210° C. and 275° C.

4. The process of claim 3, wherein the Low Temperature Fischer-Tropsch synthesis is carried out at a temperature of about 230° C. and at a pressure of about 20 bars.

5. The process of claim 1, wherein the hydrocracked diesel and naphtha products are produced by selectively hydrocracking said wax.

6. The process of claim 1, wherein said straight-run diesel and naphtha products a re produced by hydrotreating said condensate.

7. The process of claim 2, wherein said Low Temperature Fischer-Tropsch synthesis is performed using a catalyst selected from the group consisting of Fe, Co, Ni and Ru.

8. The process of claim 7, wherein the catalyst is Co.

9. The process of claim 7, wherein the catalyst is precipitated iron.

10. A process for operating a fuel cell, comprising:

providing a source of hydrocarbons, said source of hydrocarbons comprising at least one of coal, natural gas and liquid petroleum;

deriving a synthesis gas comprising hydrogen and carbon monoxide from said source of hydrocarbons;

converting said synthesis gas via Fischer-Tropsch synthesis to one or more low-sulphur hydrocarbon feedstock products, said hydrocarbon feedstock products selected from the group consisting of tail gas, condensate, wax, straight-run diesel and naphtha products, hydrocracked diesel and naphtha products, and mixtures of the foregoing; and electrochemically combining hydrogen derived from said one or more low-sulphur hydrocarbon feedstock products with an oxidant without combustion to produce electrical energy.

11. The process of claim 10, wherein said Fischer-Tropsch synthesis is a Low Temperature Fischer-Tropsch synthesis.

12. The process of claim 11, wherein the Low Temperature Fischer-Tropsch synthesis is carried out at a temperature between about 210° C. and 275° C.

13. The process of claim 12, wherein the Low Temperature Fischer-Tropsch synthesis is carried out at a temperature of about 230° C. and at a pressure of about 20 bars.

14. The process of claim 10, wherein the hydrocracked diesel and naphtha products are produced by selectively hydrocracking said wax.

15. The process of claim 10, wherein said straight-run diesel and naphtha products are produced by hydrotreating said condensate.

16. The process of claim 11, wherein said Low Temperature Fischer-Tropsch synthesis is performed using a catalyst selected from the group consisting of Fe, Co, Ni and Ru.

17. The process of claim 16, wherein the catalyst is Co.

18. The process of claim 16, wherein the catalyst is precipitated iron.

19. The process of claim 10, wherein the synthesis gas is obtained by coal gasification.

20. The process of claim 10, wherein the synthesis gas is obtained by reforming natural gas.

* * * * *